United States Patent
Cieplak et al.

(10) Patent No.: US 8,919,522 B2
(45) Date of Patent: Dec. 30, 2014

(54) WEAR INDICATOR APPARATUS, SYSTEM AND METHOD FOR CONVEYOR TRANSFER CHUTES

(75) Inventors: John Cieplak, Lisle, IL (US); James Dorynek, Carol Stream, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 153 days.

(21) Appl. No.: 13/275,566

(22) Filed: Oct. 18, 2011

(65) Prior Publication Data

US 2012/0090953 A1   Apr. 19, 2012

Related U.S. Application Data

(60) Provisional application No. 61/394,205, filed on Oct. 18, 2010.

(51) Int. Cl.
*B65G 11/16* (2006.01)

(52) U.S. Cl.
CPC .......... *B65G 11/028* (2013.01); *B65G 2207/48* (2013.01)
USPC .................................. 193/33; 193/28; 193/34

(58) Field of Classification Search
USPC ............... 193/2 R, 3, 4, 25 E, 28, 33, 34, 2 D
See application file for complete search history.

(56) References Cited

U.S. PATENT DOCUMENTS

| | | | |
|---|---|---|---|
| 3,037,468 A | 6/1962 | Snellman | |
| 3,430,393 A | 3/1969 | Landes et al. | |
| 3,922,999 A * | 12/1975 | Meginnis | 116/208 |
| 4,233,926 A * | 11/1980 | Rogers et al. | 116/208 |
| 4,328,957 A | 5/1982 | LaBate | |
| 4,962,839 A | 10/1990 | Guerid | |
| 5,055,336 A | 10/1991 | Davis | |
| 5,289,909 A | 3/1994 | Maxwell et al. | |
| 5,705,250 A | 1/1998 | Hudson, Jr. | |
| 6,041,906 A | 3/2000 | Howard | |
| 6,131,443 A * | 10/2000 | Duncan | 73/86 |
| 6,250,450 B1 | 6/2001 | Howard | |
| 6,279,715 B1 | 8/2001 | Herren | |
| 6,684,999 B1 | 2/2004 | Howard | |
| 7,232,023 B2 | 6/2007 | Ellis et al. | |
| 7,281,624 B2 | 10/2007 | Hartsuiker, Sr. et al. | |
| 7,513,352 B2 | 4/2009 | Sawall et al. | |
| 7,588,134 B2 | 9/2009 | McKeough | |
| 2008/0053785 A1 | 3/2008 | Neville et al. | |
| 2010/0084244 A1 | 4/2010 | Pittman | |
| 2011/0229291 A1* | 9/2011 | Tillman et al. | 414/298 |

FOREIGN PATENT DOCUMENTS

AU     2006200735 A1    9/2006

* cited by examiner

*Primary Examiner* — Gene Crawford
*Assistant Examiner* — Lester Rushin
(74) *Attorney, Agent, or Firm* — Fitch, Even, Tabin & Flannery LLP

(57) ABSTRACT

A wear indicator apparatus, system and method are provided for allowing wear information from an internal flow surface of a chute to be obtained from outside the chute so as not to require access to the interior thereof for wear inspection purposes. In one form, the wear indicator apparatus has a wear indicator portion that is configured to be fit into a through opening in the chute wall assembly. The wear indicator portion has a layer of wear material that is of the same material as an inner liner of the chute wall assembly, and a mounting portion that is configured to be removably fixed to an exterior surface of the wall assembly. Preferably, the wear indicator apparatus includes a removal mechanism connected to the mounting portion that is operated outside of the chute for retracting the wear indicator portion out from the wall assembly through opening.

18 Claims, 12 Drawing Sheets

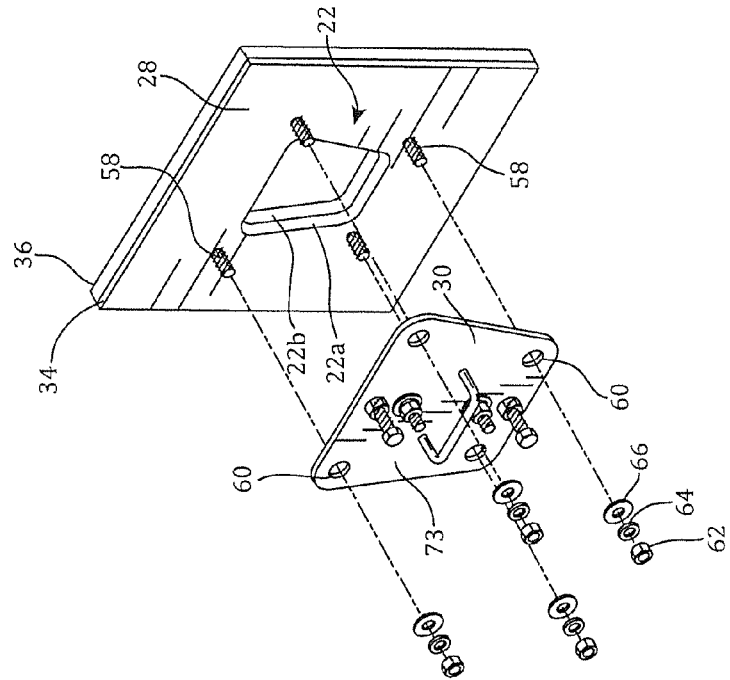
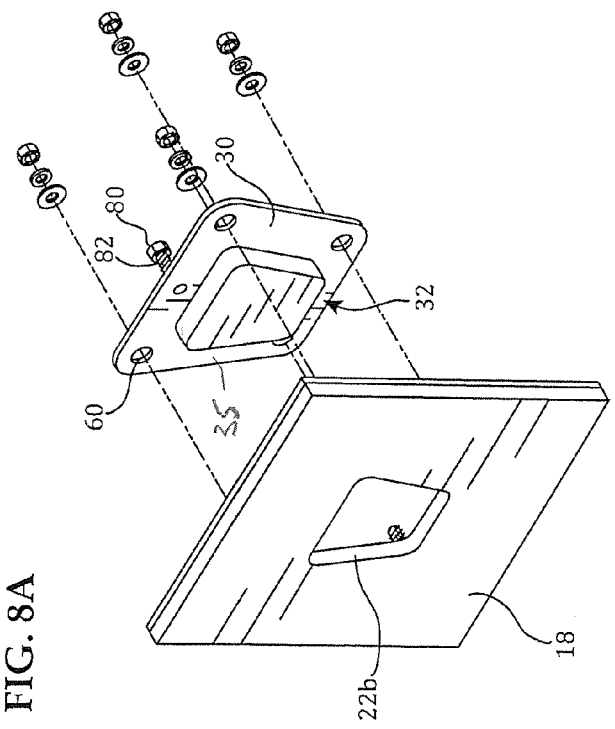
FIG. 8B
FIG. 8A

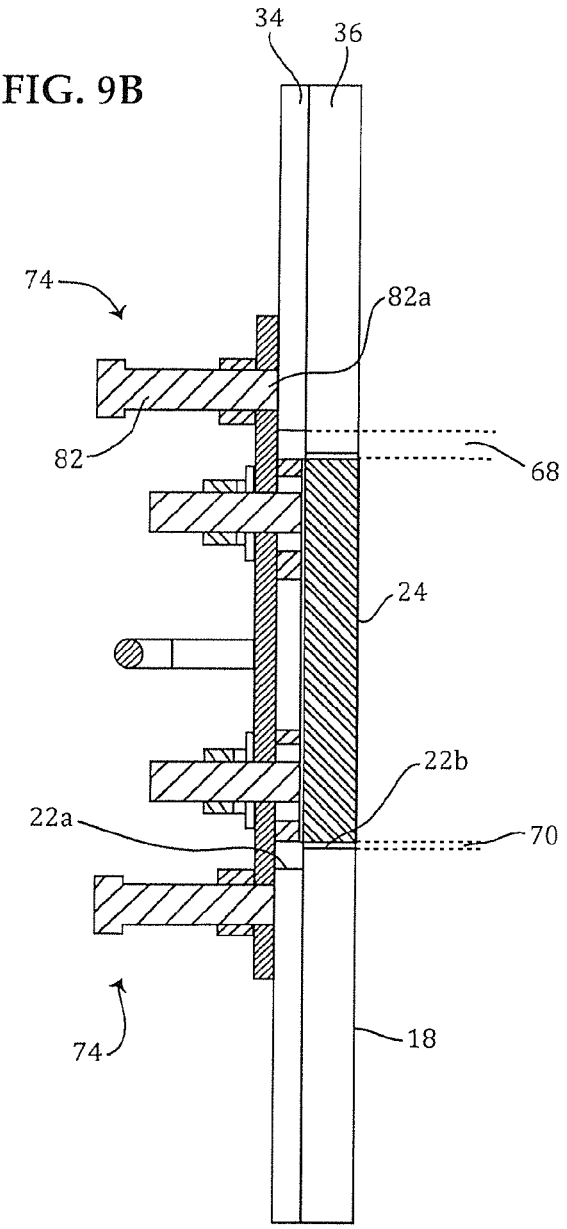
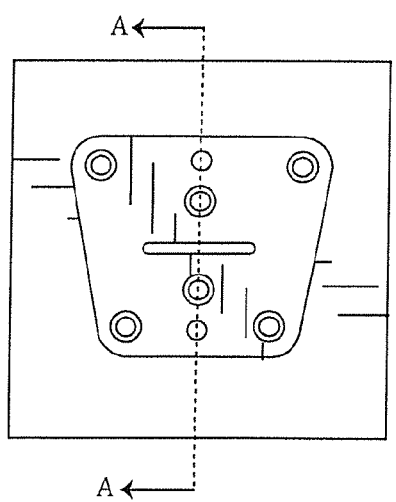
FIG. 9A
FIG. 9B

WEAR INDICATOR APPARATUS, SYSTEM AND METHOD FOR CONVEYOR TRANSFER CHUTES

CROSS REFERENCE TO RELATED APPLICATIONS

This application claims benefit under 35 U.S.C. 119 (e) to U.S. Provisional Application No. 61/394,205 entitled "Wear Indicator Apparatus, System and Method for Conveyor Transfer Chutes" filed Oct. 18, 2010, the content of which is incorporated herein by reference in its entirety.

FIELD OF THE INVENTION

The present invention relates to systems and methods for determining the wear of conveyor transfer chutes and, more particularly, to a wear indicator apparatus for indicating wear of chute components for such systems and methods.

BACKGROUND OF THE INVENTION

Transfer chutes are commonly employed in conveyor systems to transfer conveyed material from one conveyor to another. More specifically, the chutes typically receive material at an output end of one conveyor belt and direct the material to flow through the chute system to the input end of another conveyor belt which is typically at a lower elevation relative to the conveyor belt output end. Since the conveyed material can be hard and abrasive such as coal, rocks and aggregate, the chutes can be subjected to high impact and frictional forces as this material travels therethrough.

Walls of chute components are typically constructed with a less wear resistant outer shell that is lined with a harder material to provide the impact and abrasion resistance needed during transport of the conveyed material. Often the shell and liner are of different metallic materials that are secured together. For example, one known liner plate construction has a chromium carbide bimetallic plate that is welded to a soft steel backing plate. Alternatively, a tungsten carbide plate can be brazed to a soft steel backing plate to form the liner plate. In another known liner construction, hard tiles such as of ceramic material are attached to the backing plate. Once formed, the liner plates can then be bolted to the outer shell, which can be of mild steel or similar material depending on environmental needs, to form wall assemblies for the chute components.

One problem this wall assembly construction presents is that it is very difficult to know how much wear the harder liner material has undergone since the thickness of the material of the liner cannot be determined by a simple visual inspection of its interior flow surface. An additional problem relates to the practicality in performing visual inspections in the first place since it can be difficult to gain access to the interior of the chute components since they are connected together to form one, long column having walls extending entirely around and along the flow path for the conveyed material. Thus, even where ceramic tile are adhered directly to the outer shell, wear inspection of individual tiles may not be possible or may be very difficult since the interior of the chute component must be accessed for this purpose. In certain instances, such access is not available while in others it is simply impractical given the location of the chute component in the system or the location of the chute itself such as if the component is at a highly elevated position. Further, while the plates forming the components of the chute system are typically bolted together, removing these plates for liner inspection is not practical since they are usually very heavy, weighing between approximately 300 to 500 lbs each, thus requiring heavy equipment plus an operating crew for their removal. And where these components are located in difficult to access positions along the chute transfer system, the use of such heavy equipment is made all the more difficult.

Another related problem is that the liner material will wear differently depending on its location in the chute transfer system. For example, conveyor transfer chutes are typically formed from three types of components: an intake hood, intermediate components, and discharge spoons. Typically, the intake hood and the discharge spoon will have a curve or be angled to redirect conveyed material from one conveyor belt onto another, although the intermediate components can also have curves or bends to redirect the material flow as well. At these directional changes of material flow, there can be greater wear due to higher impact forces generated by the flowing material with the interior chute liner flow surface. Thus, even if the difficult process of plate removal for inspection were to be undertaken, the inspection of the plates for wear may not provide the needed wear information. This is because, in addition to being heavy, the plates can be fairly large with a 2 foot by 4 foot liner plate being considered relatively small, and with larger liner plates typically being 4 feet by 6 feet in size. As is apparent, because of the large size of the liner plates, the wear at different places along the interior flow surface of the plates can be different than at the edges where the thickness of the lining can be visually inspected.

In any case, because it is difficult to know when the liner will wear through, there is increased risk in developing a hole in the chute itself. For instance, while the harder liner material may last for six months to a year before it wears through, the softer shell material can wear through in a matter of weeks once it is exposed to the forces generated by the material flowing therealong. Thus, unless short interval wear checks are regularly performed, such as on a weekly basis, components of the transfer chutes can be irreversibly damaged which requires that the entire system be shut down so that the affected sections of the transfer chute system can be disassembled and the damaged component or components replaced.

Accordingly, there is a need for a wear inspection mechanism for conveyor transfer chutes. More particularly, there is a need for a system and method that provides ease in determining the wear of components of transfer chute systems at various locations along the material flow path.

SUMMARY OF THE INVENTION

In accordance with one aspect of the present invention, a wear indicator apparatus for a conveyor transfer chute system is provided including a removal mechanism that allows the apparatus to be removed from the outside of the chute component for obtaining wear information for the interior liner material thereof. Generally, the wear indicator apparatus includes a mounting portion and a wear indicator portion with the mounting portion configured to be fixed to the exterior surface of the wall assembly of the chute component, and specifically the outer shell thereof, and the wear indicator portion configured to be inserted into a through opening in the chute component wall assembly and having a layer of wear material thereof that is substantially matched to the layer of the inner lining of the wall assembly. In this regard, it is preferable for the wear material layer of the wear indicator portion to be of the same material and thickness as that of the liner wear material.

The removal mechanism for the wear indicator apparatus is configured so as to allow one to easily remove the apparatus for performing an inspection of the wear indicator portion, and specifically the wear indicator layer of material to determine how much wear is occurring at the location at which the wear indicator apparatus is mounted to the chute component along its interior flow surface. In one preferred form, the removal mechanism consists of fasteners configured to be operated external of the chute component with conventional hand-held manual or power tools that cause the apparatus to controllably separate from the chute component to which it is mounted with the wear indicator portion being retracted out from the through opening thereof. In one form, common jack bolts can be utilized mounted into threaded apertures of the mounting portion of the wear indicator apparatus to extend from the exterior or outwardly facing surface thereof so as to project away from the chute wall assembly. The jack bolts are turned in engagement with the exterior surface of the chute component to cause the apparatus to be retracted along the shanks of the bolts.

In one form, the mounting portion of the wear indicator apparatus includes a mounting plate and the wear indicator portion of the apparatus includes a plug portion affixed to the mounting plate. The plug portion is sized to be in clearance fit with the wall assembly through opening and is provided with a thickness substantially the same as that of the wall assembly to which it is mounted so that the interior surface of the plug portion is substantially flush with the interior surface of the wall assembly. Thus, removing the apparatus from the through opening essentially allows removal of a cross-section of the wall assembly including the inner wear liner thereof to further allow for a determination of its wear based on any reduction in the thickness of inner wear layer of the apparatus.

More particularly, the plug portion can be formed of different layers of material with one layer having a thickness generally corresponding to the thickness of the outer shell of the wall assembly and another layer of wear material having a thickness generally corresponding to the thickness of the inner liner of the wall assembly so that when the plug portion is inserted into the through opening in the wall assembly, the interior surface of the wear layer is flush with the interior surface of the liner wear layer. Alternatively, the plug portion can include multiple layers that combined have a thickness corresponding to that of the outer shell. The multiple layers can include one or more shim members used to increase the overall thickness of the plug portion so as to properly align the interior surfaces of the wear layer and the liner, if necessary.

In another aspect, the wear indicator apparatus is provided in combination with a conveyor transfer chute system that has a specific chute components provided with through openings at specific, preselected locations thereof each configured for fitting of the plug portion of a wear indicator apparatus therein. Generally, in engineered transfer chute systems it is expected that it is known where high, normal and low wear rate locations are present in the transfer chute system, and by strategically placing the wear indicator apparatus at these locations, wear information can be obtained to determine how the chute system is performing. For example, if based on inspections of the various wear indicator apparatuses employed in a particular transfer chute system there is greater wear than expected at a low wear location and/or there is less wear than expected at a high wear location, this wear information may lead to design modifications in the transfer chute system to address these inconsistencies.

In another aspect, the plug portion of the wear indicator apparatus and the through opening in the chute component are keyed relative to one another so that the plug portion can only be inserted in a single orientation into the through opening. In one form, the plug portion and the through opening each have a trapezoidal configuration. In this manner, plug portion can only be fit into the through opening in a single orientation thereof so that if the apparatus is removed for wear inspection, the plug portion has to be fit back into the through opening in the same orientation. Thus, if wear along the interior surface of the plug portion varies, when the plug portion is fit back into the through opening there will not be an offset or ledge created between the interior surface of the plug portion and the interior surface of the liner. Such a ledge is highly undesirable as it can create turbulence in the material flow through the transfer chute system potentially causing faster wear of the liner wear material.

BRIEF DESCRIPTION OF THE DRAWINGS

FIGS. 8A and 8B are perspective views of the wear indicator apparatus aligned for being mounted to the chute component wall assembly with the plug portion thereof to be received in the wall assembly through opening;

FIG. 9A is an elevational view of the wear indicator apparatus mounted to the chute component wall assembly showing the mounting plate secured to the exterior surface of the outer shell of the wall assembly;

FIG. 9B is a cross-sectional view taken along line A-A of FIG. 9A showing clearances between different portions of the plug portion of the wear indicator apparatus and corresponding portions of the through opening of the wall assembly;

DETAILED DESCRIPTION OF THE PREFERRED EMBODIMENTS

Figure 1:
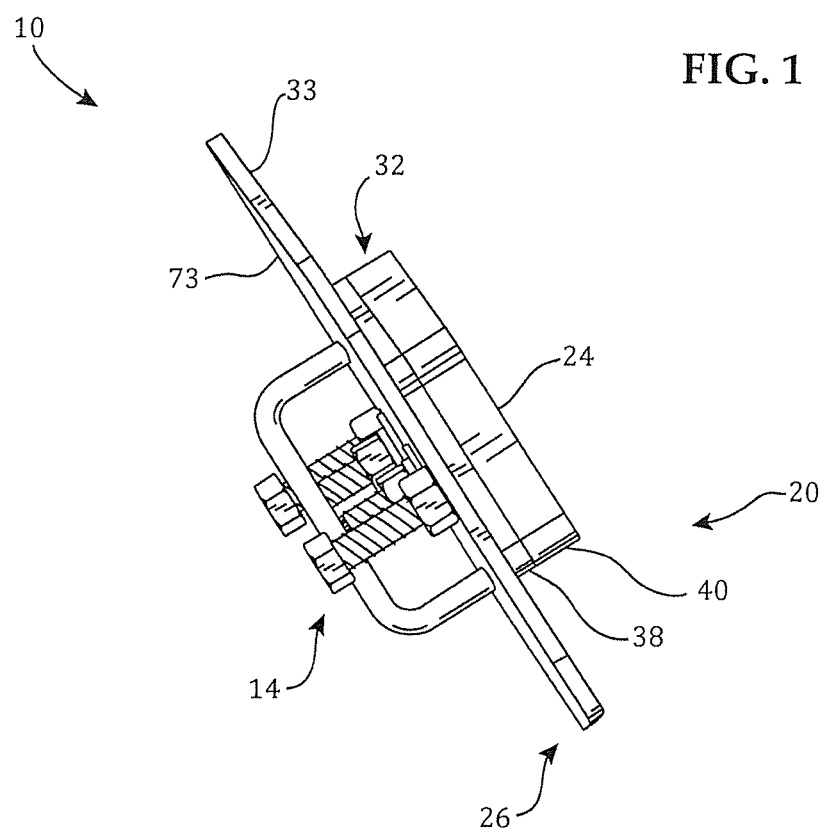
FIG. 1 is a perspective view of a wear indicator apparatus in accordance with the present invention showing a mounting portion and wear indicator portion thereof.
Figure 2:
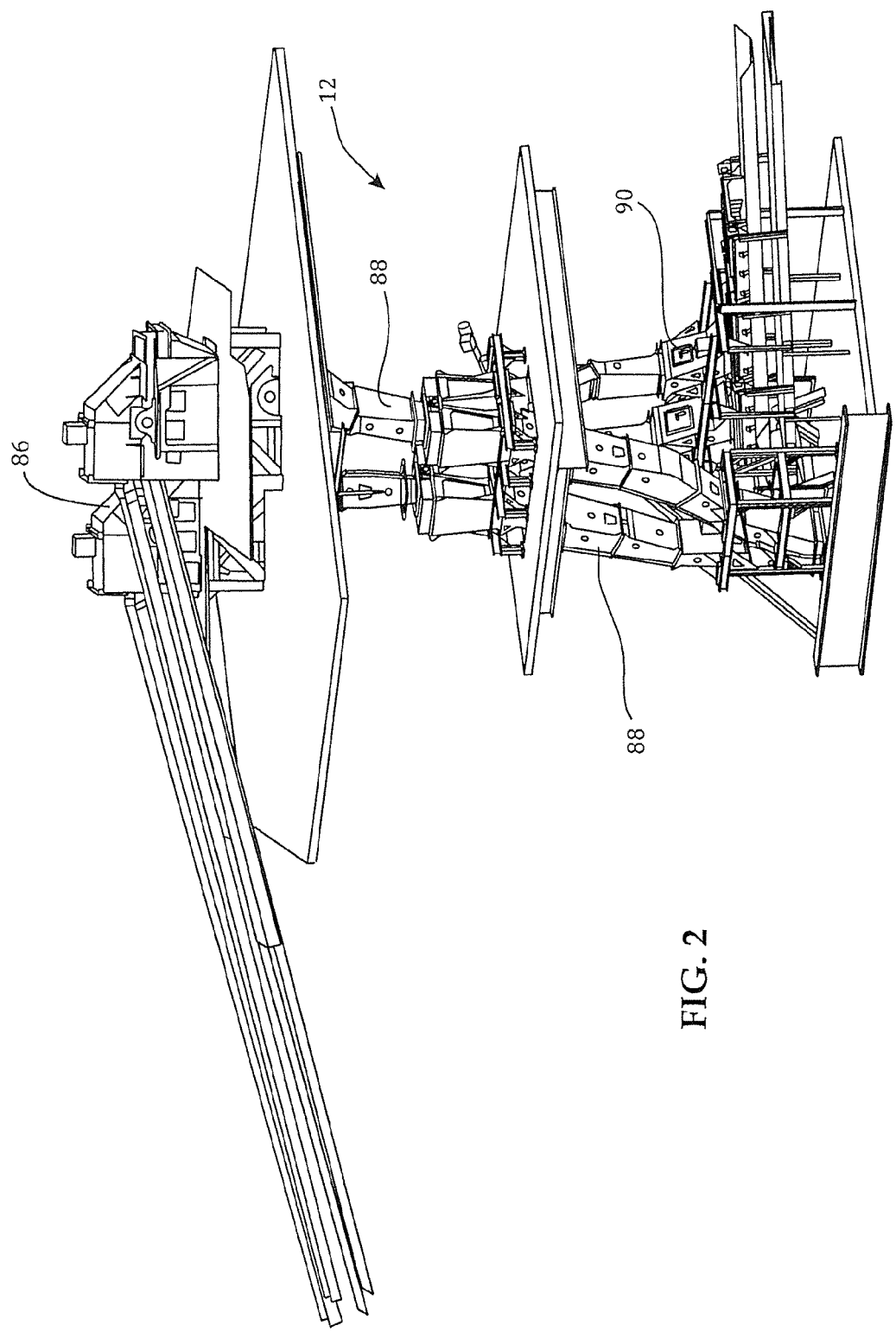
FIG. 2 is a perspective view of a chute transfer system for conveyor belts in which the wear indicator apparatus of FIG. 1 can be utilized.
Figure 3:
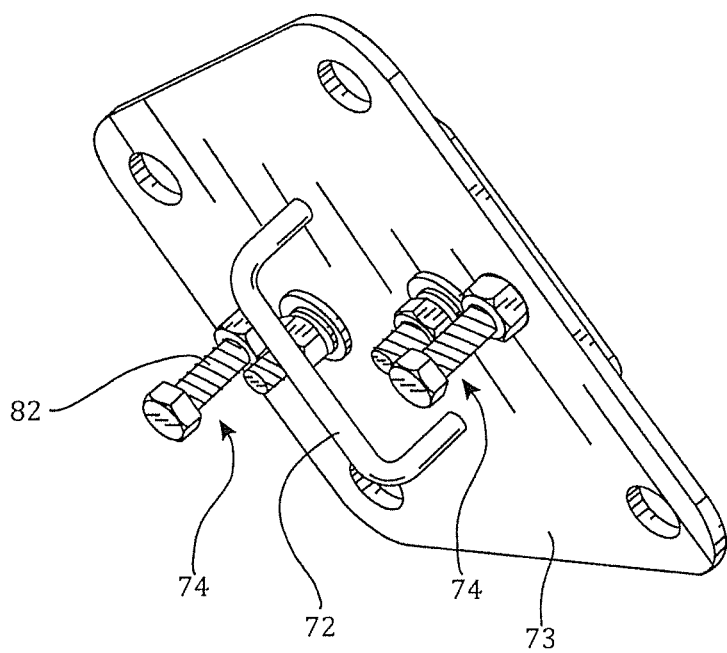
FIG. 3 is a perspective view of the wear indicator apparatus of FIG. 1 showing a mounting plate of the mounting portion having jack bolts and a handle projecting from an exterior surface thereof.

FIG. 1 shows a wear indicator apparatus 10 for a conveyor transfer chute system 12 (FIG. 2) in accordance with the present invention. The wear apparatus 10 is configured to be utilized with the various components of the conveyor transfer chute system 12 from which wear information is desired. In this regard, the wear indicator apparatus 10 is well suited to provide such wear information in a relatively convenient and quick manner. For this purpose, the wear indicator apparatus 10 has a removal mechanism generally designated 14 which allows for the apparatus 10 to be removed from a wall assembly 16 of one of the chute components from outside of the chute component. In this manner, the wear indicator apparatus 10 does not require that someone desiring wear information have access to the interior of the chute components for performing a visual inspection of the internal flow surface 18 thereof.

Further, the wear indicator apparatus 10 has a relatively small wear indicator portion 20 thereof adapted to fit in a corresponding through opening 22 in the wall assembly 16 as discussed further hereinafter, such that the internal wear surface 24 of the wear indicator portion 20 has a relatively small surface area, e.g. approximately 22.2 in$^2$. Because of its small wear surface area, when the wear indicator apparatus 10 is removed from the wall assembly 16, reliable information can be obtained from the wear of the internal wear surface 24 with respect to the wear of the adjacent portions of the internal flow surface 18 around the wall assembly through opening 22. In this regard, the overall size of the wear indicator apparatus 10 is also relatively small so that it is easy for a single person to mount it to the wall assembly 16 and remove it therefrom for wear inspection purposes. By way of example, the wear indicator apparatus 10 illustrated herein can weigh approximately 14 lbs.

The wear indicator apparatus 10 has a mounting portion 26 to which the wear indicator portion 20 is secured with the mounting portion 26 adapted to be affixed to an exterior or external surface 28 of the chute component wall assembly 16 while the wear indicator portion 20 is fit into the through opening 22. More specifically, and referencing FIGS. 1 and 4-6, it can be seen that the mounting portion 26 can be in the form of mounting plate 30 and the wear indicator portion 20 can be in the form of plug portion 32 secured generally centrally on the mounting plate 30 to project from inwardly facing surface 33 thereof. The mounting plate 30 is sized to be larger than the through opening 22 with the plug portion 32 sized to be in clearance fit therein. As illustrated, the mounting plate 30 has a periphery or perimeter extending about its outer edge or edges larger than the corresponding periphery or perimeter of the plug portion 36 extending thereabout so that the mounting plate 30 forms an outer, mounting flange portion 35 of the wear indicator apparatus 10 that extends beyond and around the outer periphery of the plug portion 32.

In this manner, when the plug portion 32 is fit in clearance into the through opening 22 to expose the internal wear surface 24 thereof to the chute internal flow surface 18, the mounting plate 30 and specifically the mounting flange portion 35 will engage flush against the external surface 28 of the wall assembly 16 surrounding the through opening 22. As shown, the external surface 28 has a flat configuration although non-flat configurations e.g., curved or angled, could also be provided depending on the configuration of the specific transfer chute component. As such, the illustrated mounting plate 30 has a generally flat configuration but could also be provided with non-flat configurations to match the configuration of the external surface 28 of the chute component for being engaged in a substantially flush manner therewith.

Further, the plug portion 32 is provided with a thickness corresponding to that of the wall assembly 16 so that the internal wear surface 24 thereof will be aligned flush with the internal flow surface 18 of the wall assembly 16 with the mounting plate 30 affixed to the external surface 28 of the wall assembly 16. With the surfaces 18 and 24 flush with each other, the wear surface 24 will wear to the same extent as the surrounding internal flow surface 18 so that when the wear indicator apparatus 10 is removed from the wall assembly 16 via the removal mechanism 14 thereof, inspection of the plug portion 32 will provide an accurate indication of the wear that has occurred in the wear layer of the wall assembly 16 on the internal flow surface 18 thereof. More specifically, since the thickness of the plug portion 32 before being exposed to material flow is known, any reduction in its thickness after exposure to material flow will provide the desired wear information for the wall assembly 16 at the area of the internal flow surface 18 adjacent to the through opening 22 therein.

Figure 4:
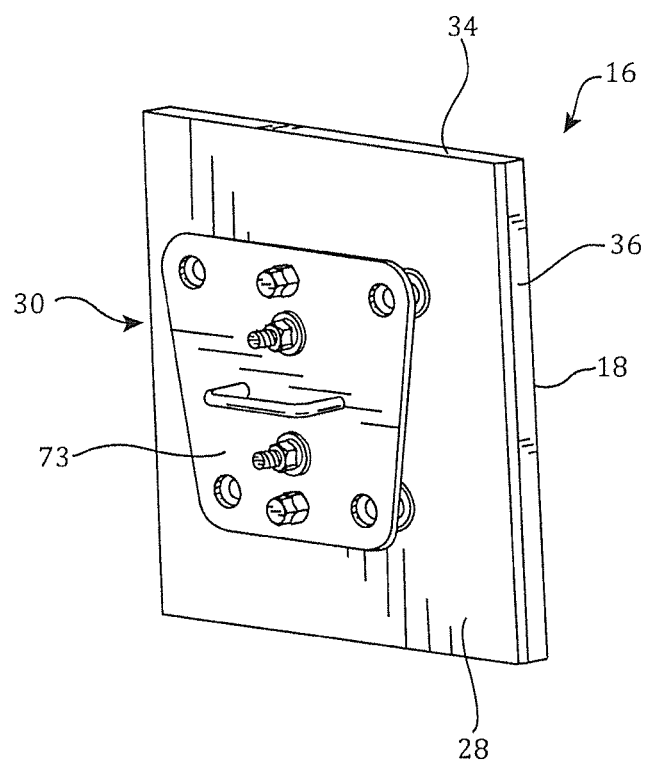
FIG. 4 is a perspective view of the wear indicator apparatus and an external surface of a wall assembly of a transfer chute component to which the apparatus is to be mounted.
Figure 5:
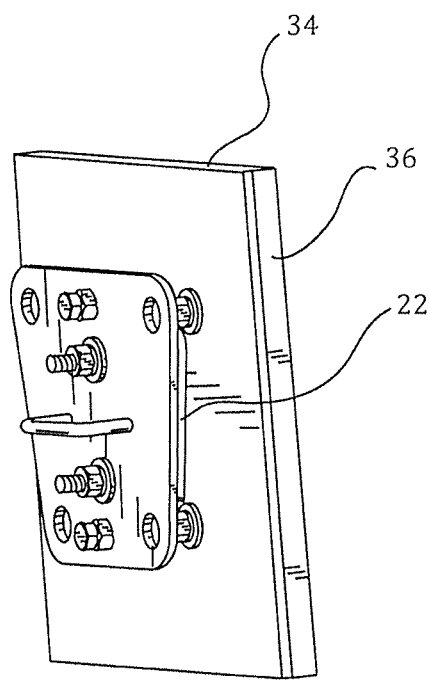
FIG. 5 is a perspective view of the wear indicator apparatus and the chute component wall assembly showing a through opening in the wall assembly.
Figure 6:
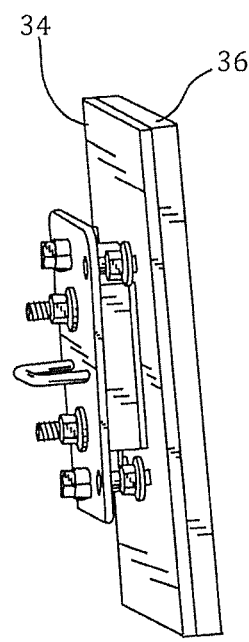
FIG. 6 is a perspective view of the wear indicator apparatus and chute component wall assembly showing the wear indicator or plug portion of the wear indicator apparatus aligned with the through opening of the wall assembly for being inserted therein.
Figure 9C:
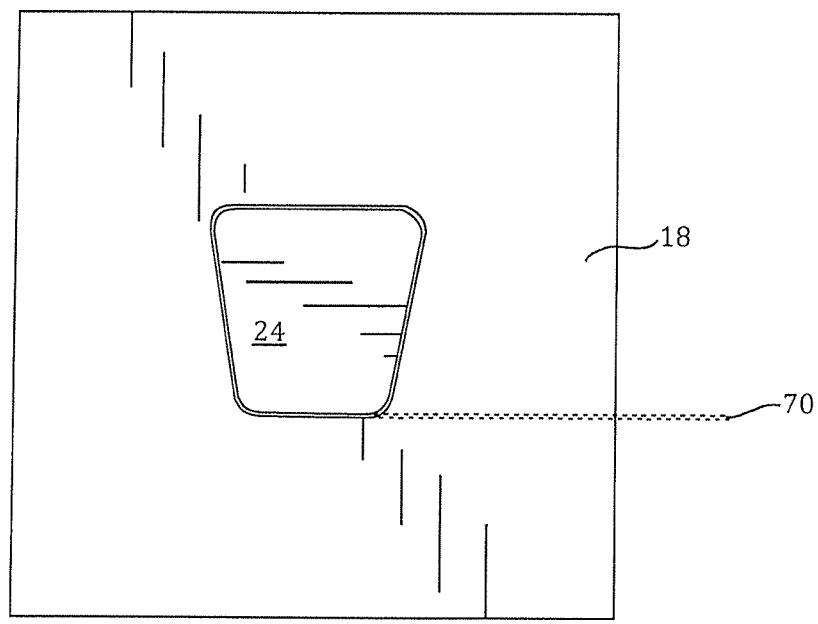
FIG. 9C is an elevational view of the interior of the chute component showing the interior flow surface of the liner of the chute wall assembly and the interior surface of the wear indicator liner member of the wear indicator apparatus, and the clearance therebetween.
Figure 9D:
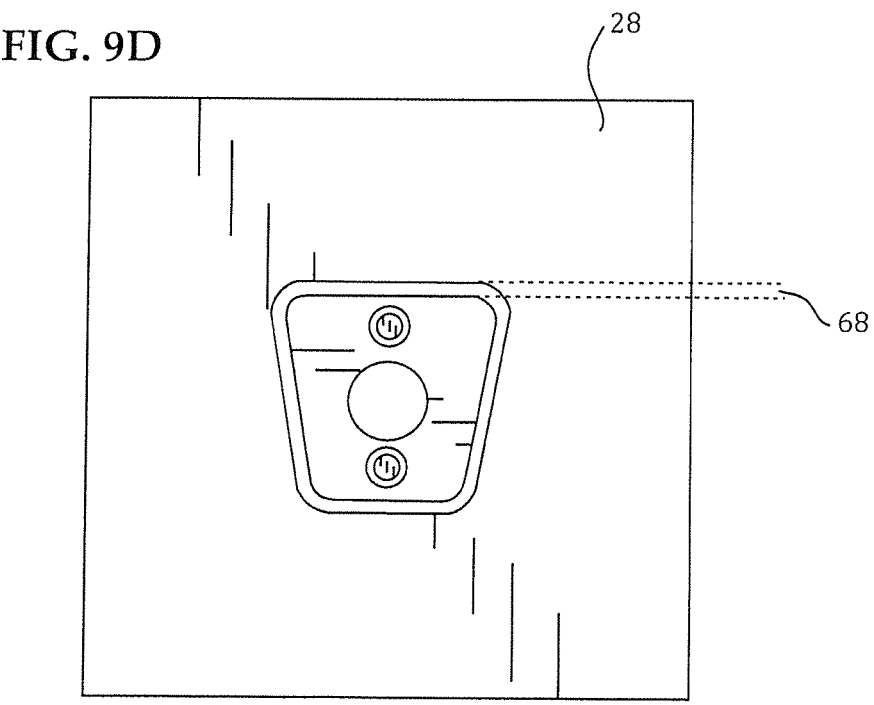
FIG. 9D is an elevational view of the exterior of the chute component with the wear indicator liner member of the wear indicator apparatus plug portion removed to show the larger clearance between the base portion and the through opening of the wall assembly.

Wall assemblies 16 for components of conveyor transfer chute systems 12 can vary widely. One known construction uses a less wear resistant, outer shell 34 and a more wear resistant, harder liner 36. For example, the liner plates 36 can have an inner wear layer of tungsten, chromium carbide or stainless steel material secured on a more ductile substrate such as a backing plate of mild steel material. These liner plates 36 are then bolted to the thinner outer shell 34 so that the wall assembly 16 has a multi-layered construction, as shown in FIGS. 4-6. The plug portion 32 of the wear indicator apparatus 10 is preferably provided with substantially the same construction as the wall assembly 16 in that the layer closest to the mounting plate 30 can correspond to the thickness of the outer shell 34 and the innermost layer can correspond in thickness to the thickness of the liner or liner plate 36. More specifically, the plug portion 32 has a base portion 38 secured generally centrally to the mounting plate 30 and which can be provided with a thickness that is the same as that of the outer shell 34, and a wear indicator layer in the form of liner member 40 secured to the base portion 38 with the liner member 40 having a thickness that is the same as that of the liner 36. In this manner, when the wear indicator apparatus 10 is secured to the wall assembly 16 with the plug portion 32 inserted in the through opening 22, the internal wear surface 24 of the wear indicator liner member 40 will be flush with the internal flow surface 18 of the liner 36 of the wall assembly 16 (see FIG. 9B).

Figures 7A, 7B:
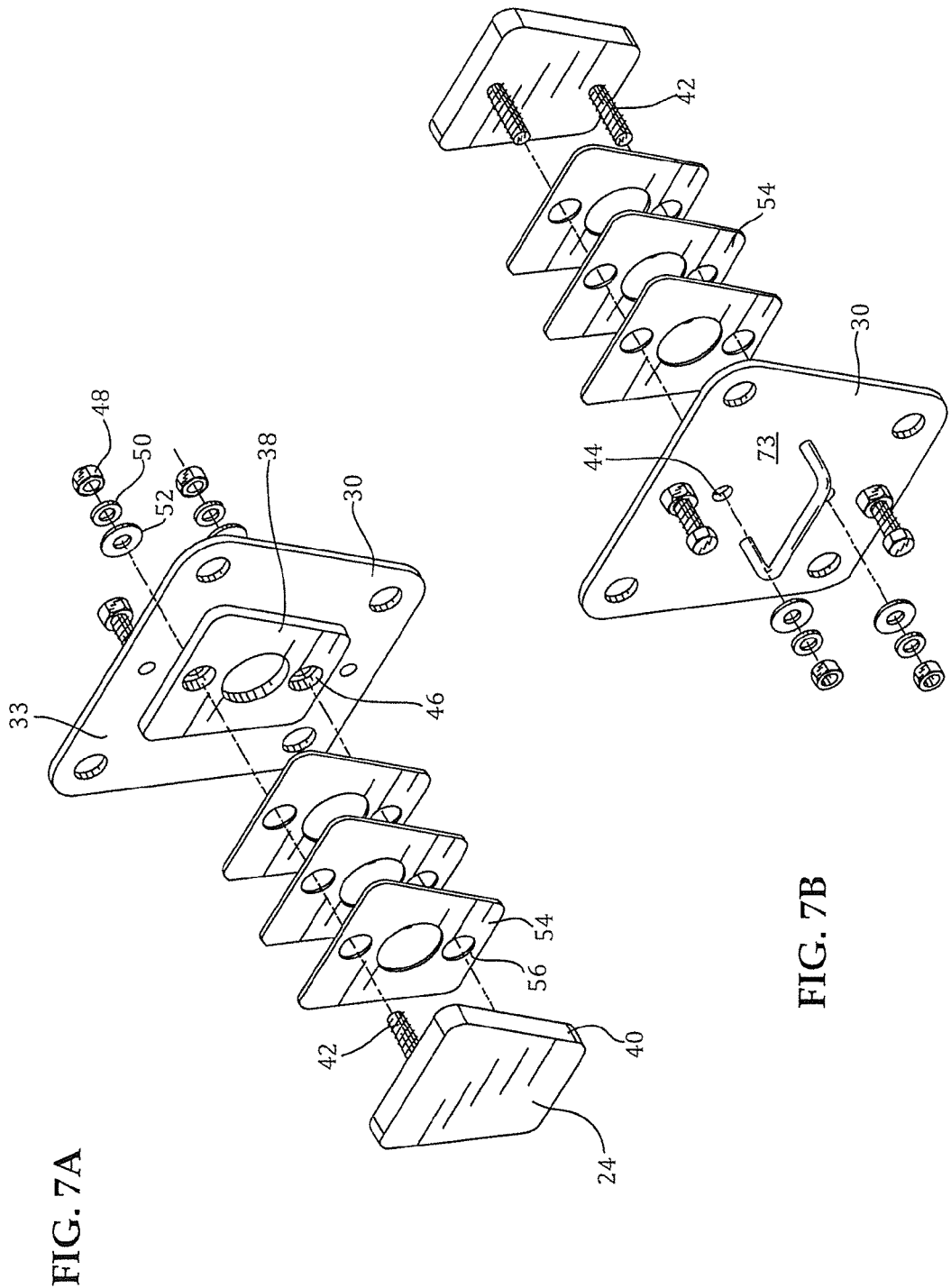
FIGS. 7A and 7B are exploded, perspective views of the wear indicator apparatus showing a mounting plate, and the plug portion as including a wear indicator liner member and a base portion with optional shim members for being fastener between the wear indicator liner member and the base portion.

Referring to FIGS. 7A and 7B, the wear indicator liner member 40 can be secured to the mounting plate 30 and the base portion 38 thereof via fasteners. As shown, the wear indicator liner member 40 can include a pair of threaded studs 42 projecting rearwardly therefrom with the mounting plate 30 and base portion 38 each including a pair of aligned through apertures 44 and 46, respectively, for receiving the studs 42 therethrough where they can receive nuts 48 and washers 50 and 52 on their threaded ends to tightly clamp the liner member 40 to the base portion 38. Because the wear indicator liner member 40 is removably mounted to the mounting plate 30, the effective thickness of the plug portion 32 is made to be adjustable. This is of importance in terms of being able to properly align the internal wear surface 24 of the liner member 40 with the internal flow surface 18 of the wall assembly 16. In this regard, it would be possible to provide different liner members 40 having varying thicknesses. However, a more cost effective approach is provided via the use of thin plate, shim adjustment members 54 as illustrated. An appropriate number of shim members 54 can be sandwiched between the wear indicator liner member 40 and the base portion 38 to achieve the desired thickness for the plug portion 32 for positioning the internal wear surface 24 in substantial flush relation with the adjacent chute internal flow surface 18. As shown, the shim members 54 each have a pair of apertures 56 aligned with the apertures 44 and 46 for receiving the studs 42 of the liner member 40 therethrough so that the selected number of shim members 54 are clamped between the base portion 38 and the liner member 40 when the liner member 40 is fastened to the mounting plate 30.

As illustrated, it is preferred that the plug portion 32 have a keyed fit in wall assembly through opening 22, so as to only be able to be fit therein a single orientation thereof. In this manner, should wear along the internal wear surface 24 of the plug portion 32 vary thereacross, the plug portion 32 cannot be reinserted into the through opening 22 so as to create offsets or ledges between the plug portion surface 24 and the adjacent internal flow surface 18. The illustrated through opening 22 and plug portion 32 each have a trapezoidal configuration, although it will be recognized that other keyed, mating configurations thereof could also be employed.

With the wear indicator apparatus 10 assembled, it can be mounted to one of the wall assemblies 16 of a component of the conveyor transfer chute system 12 that is provided with a through opening 22 therein as described above. One or more through openings 22 can be formed in a particular chute component and at specific locations from which wear information is desired. The wall assembly 16, in addition to being provided with an appropriately sized and configured through opening 22, can include multiple mounting studs 58 projecting outwardly from the exterior surface 28 thereof, as shown in FIG. 8B. The outer flange portion 35 of the mounting plate 30 is provided with corresponding apertures 60 arranged such that when the plug portion 32 is inserted into the through opening 22, the studs 58 will extend through the apertures 60 with their threaded ends projecting beyond the plate 30 for receiving nuts 62 and washers 64 and 66 thereon to clamp the plate 30 to the wall assembly exterior surface 28 securing the apparatus 10 to the wall assembly 16. In this regard, it is noted that the plate 30 is larger than the through opening 22 so that it can be clamped against the wall surface 28 as described above. In the illustrated form, the studs 58 are located adjacent corners of the trapezoidal opening 22, and the plate 30 similarly is provided with a trapezoidal configuration, albeit larger in size than the through opening 22, with the apertures 60 provided at the corners thereof.

To fit the plug portion 32 into the through opening 22, a clearance fit is provided therebetween. However, to provide for both the ease of installation of the wear indicator apparatus 10 to the wall assembly 16 while at the same time keeping the clearance spacing between the wear surfaces 18 and 24 to a minimum, the through opening 22 is provided with a stepped construction. To this end, opening 22a formed in the outer shell 34 is slightly oversized with respect to opening 22b formed in the liner plate 36, as can be seen in FIGS. 8B and 9B-9D. For example, the clearance 68 between the side edges of the plug portion 32 and the corresponding side edges of the larger opening 22a is approximately ⅜ inch to permit the plug portion 32 to be easily introduced and inserted into the through opening 22. After insertion has begun, the plug portion 32 then moves into the opening 22b in the liner 36 where the edges of the plug portion 32 and the corresponding edges of the opening 22b have a tighter clearance fit therebetween, e.g. a clearance 70 of 1/16 inch. In this manner, there are no large gaps between the internal wear surface 24 of the plug portion 32 and the adjacent internal flow surface 18 that could create potential for hang ups and turbulence in the material flow therealong.

The mounting plate 30 also preferably includes a handle 72 to aid in the installation of the apparatus 10 to the wall assembly 16, and for removal therefrom. In the illustrated form, the handle 72 is shown as projecting from the outer, or outwardly facing surface 73 of the mounting plate 30 and extending horizontally thereacross generally parallel to the upper and lower parallel edges thereof and centrally therebetween. The fastened ends of the studs 42 project above and below the handle 72.

Figure 10A:
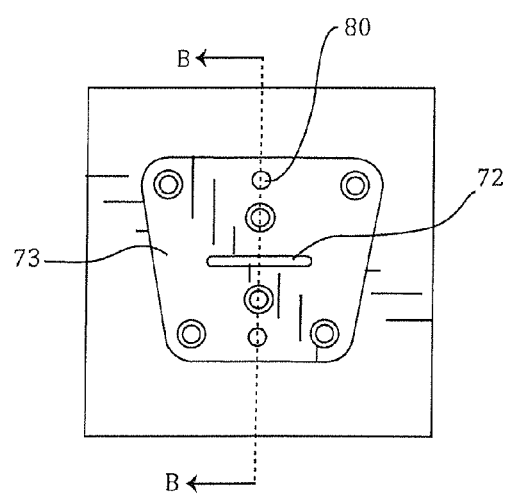
FIG. 10A is an elevational view of the wear indicator apparatus being removed from the chute component wall assembly.
Figure 10B:
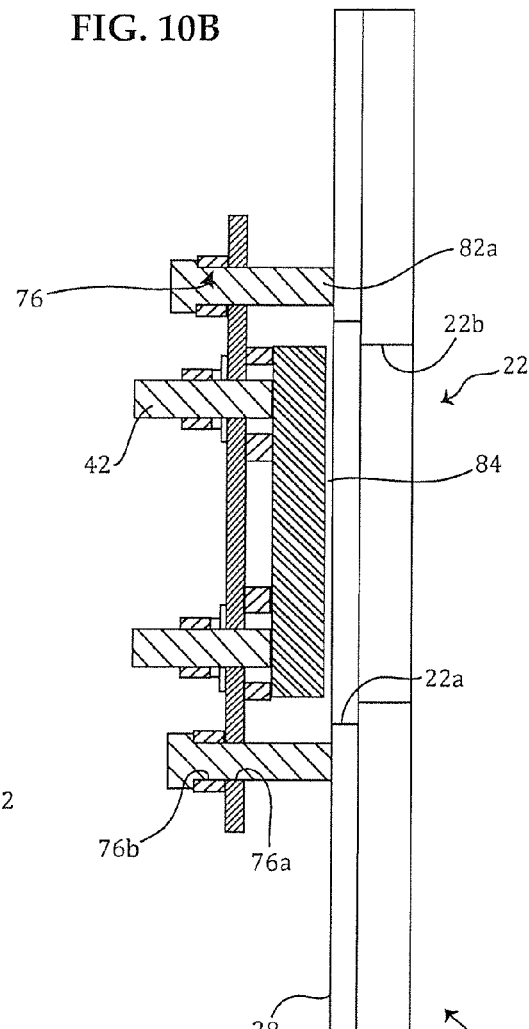
FIG. 10B is a cross-sectional view taken along line B-B of FIG. 10A showing the jack bolts operated to retract the plug portion of the wear indicator apparatus out from the through opening of the wall assembly.
Figure 10C:
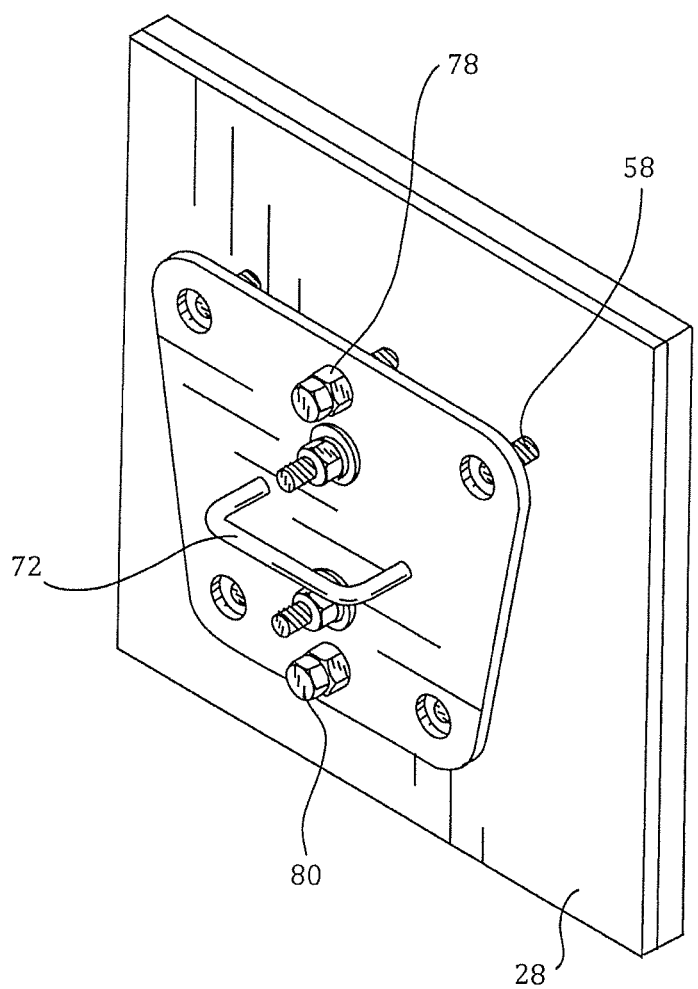
FIG. 10C is a perspective view showing the heads of the jack bolts engaged against threaded nuts fixed to the mounting plate for removing the wear indicator apparatus from its mounting to the wall assembly.

FIGS. 10A-10C are next referenced to illustrate the removal process for removing the apparatus 10 from the wall assembly 16 via the external removal mechanism 14. The removal mechanism 14 is illustrated in the form of fasteners that can be operated from outside the chute component to separate the mounting plate 30 from the wall assembly 16 and to retract the plug portion 32 out from the through opening 22. More specifically, the removal mechanism fasteners can be the form of a pair of jack bolts 74 that are mounted in corresponding threaded apertures 76 of the mounting plate 30 to project away from the plate outer or outwardly facing surface 73. In the illustrated form, the jack bolts 74 and apertures 76 are located above and below the corresponding upper and lower studs 42 projecting through the plate openings 44 therefor. The threaded apertures 76 can each include an aperture 76a in the flange portion 35 of the plate 30 and an aligned threaded aperture 76b of a nut 78 affixed to the plate 30, as can be seen in FIGS. 10B and 10C.

Accordingly, to remove the apparatus 10 for wear inspection purposes, the nut 62 and washers 64 and 66 are first removed from the ends of each of the studs 58. Referring to FIG. 9B, when the apparatus 10 is installed to the wall assembly 16, the jack bolts 74 have their drive heads 80 spaced from the corresponding nuts 78 by a predetermined distance along the elongate shanks 82 thereof with their distal ends 82a in abutment with wall external surface 28. To remove the apparatus 10, the drive heads 80 are turned in a retraction or removal rotary direction to cause the nuts 78 and plate 30 attached thereto to be retracted along the threaded shanks 82 until the drive heads 80 engage the corresponding nuts 78, as shown in FIG. 10B. This removal procedure can be performed relatively easily by a single person using hand held tools such as a wrench for turning the bolts 74 while holding the handle 72.

The shanks 82 are sized such that the predetermined distance from the drive heads 80 to the nuts 78 in the installed position is greater than the thickness of the plug portion 32. Thus, when the drive heads 80 are engaged with the corresponding nuts 78 as shown in FIG. 10B, there will be a clearance spacing 84 between the plug inner wear surface 24 and the exterior surface 28 of the wall assembly 16 to allow the apparatus 10 to be pulled off of the studs 58 with the plug portion 32 out and clear from the through opening 22.

The wear indicator apparatus 10 described herein allows for precise wear information on the liner plates 36 to be obtained since the apparatus 10 allows one to perform a quick visual as well as an actual physical measurement of the wear characteristics of the liner 36 in the area of its internal flow surface 18 around the through opening 22 therein since the plug liner member 40 essentially represents a cross-section of the chute liner 36. Thus, any significant reduction in the thickness of the liner member 40 will be easy to see and measure. For example, if only ten percent of the wear material layer or liner member 40 remains, then replacement of the liner 36 can be undertaken well before the wall assembly 16 wears through and a hole is formed therein. Further, the through openings 22 with a wear indicator apparatus 10 installed in each can be strategically located throughout the transfer chute system 12 in the various components thereof, such as the intake hood components 86, intermediate chute components 88, and discharge spoon components 90, where wear information is desired. The wear indicator apparatuses 10 installed at these preselected locations will allow for convenient and quick periodic wear checks to be performed to provide valuable information on how different areas of the system 12 are performing in terms of their wear. This information allows the system design to more selectively address areas that have the highest measured wear rates. In addition, the wear information obtained from inspections of the wear indicator apparatuses 10 can be correlated to various operational factors including specific configurations of transfer chute systems 12, the type of material to be conveyed, material flow speed and volumetric flow rate, and angle of contact with the flow surfaces 18. This data will allow predictive models to be developed that allow transfer chute designers to better determine the optimal time for liner replacement for particular installations of transfer chute systems 12.

Those skilled in the art will recognize that a wide variety of modifications, alterations, and combinations can be made with respect to the above described embodiments without departing from the spirit and scope of the invention, and that such modifications, alterations, and combinations, are to be viewed as being within the scope of the invention.

What is claimed is:

1. An apparatus for indicating wear of a liner in a transfer chute, the apparatus comprising:
   a wear indicator portion configured to be inserted into a through opening in a wall assembly of the transfer chute;
   a layer of wear material of the wear indicator portion for being received in the wall assembly through opening and being of the same material as material of an inner lining of the wall assembly; and
   a mounting portion connected to the wear indicator portion and configured to be removably fixed to an exterior surface of the wall assembly to allow the wear indicator portion to be removed from outside the transfer chute for checking wear of the layer of wear material,
   wherein the mounting portion includes a mounting plate sized to engage the exterior surface of the wall assembly with the wear indicator portion inserted in the wall assembly through opening, and the wear indicator portion includes a base portion secured to the mounting plate, and the layer of wear material comprises a liner member secured to the base portion and being of the same material as that of the wall assembly inner lining,
   wherein the liner member is removably secured to the base portion, and
   at least one shim member of the wear indicator portion configured to be secured between the base portion and the liner member for adjusting the thickness of the wear indicator portion.

2. The apparatus of claim 1 wherein the wear indicator portion is configured to have a keyed fit in the wall assembly through opening for fitting therein in only a single orientation.

3. The apparatus of claim 1 including a removal mechanism connected to the mounting portion and configured to be operated outside of the transfer chute to retract the wear indicator portion out from the wall assembly through opening.

4. A conveyor transfer chute system comprising:
   at least one chute having an interior for forming a flow path for transferring conveyed material from one conveyor to another conveyor;
   a wall of the chute extending about the flow path and having an internal flow surface of a predetermined wear resistant material along which the material flows;
   a though opening in the chute wall at a predetermined location from which wear information is desired;
   a wear indicator apparatus configured to be mounted to the chute wall for providing information regarding wear of the internal flow surface;
   a wear indicator portion of the wear indicator apparatus having an internal wear surface of the same wear resistant material as the internal flow surface and being configured to be fit in the chute wall through opening with a clearance fit therebetween to expose the internal wear surface to the material flow at the internal flow surface with the clearance fit forming a gap between the internal wear surface of the wear indicator portion and the internal flow surface of the chute wall with the wear indicator portion fit in the chute wall through opening; and
   a removal mechanism of the wear indicator apparatus that is operable outside the chute to retract the wear indicator portion out from the through opening for wear inspection.

5. An apparatus for indicating wear of a liner in a transfer chute, the apparatus comprising:
   a wear indicator portion configured to be inserted into a through opening in a wall assembly of the transfer chute;
   a layer of wear material of the wear indicator portion for being received in the wall assembly through opening and being of the same material as material of an inner lining of the wall assembly; and
   a mounting portion connected to the wear indicator portion and configured to be removably fixed to an exterior surface of the wall assembly to allow the wear indicator portion to be removed from outside the transfer chute for checking wear of the layer of wear material a conveyor transfer chute system comprising:
   at least one chute having an interior for forming a flow path for transferring conveyed material from one conveyor to another conveyor;
   a wall of the chute extending about the flow path and having an internal flow surface of a predetermined wear resistant material along which the material flows;
   a though opening in the chute wall at a predetermined location from which wear information is desired;
   a wear indicator apparatus configured to be mounted to the chute wall for providing information regarding wear of the internal flow surface;
   a wear indicator portion of the wear indicator apparatus having an internal wear surface of the same wear resistant material as the internal flow surface and being configured to be fit in the chute wall through opening to expose the internal wear surface to the material flow at the internal flow surface; and a removal mechanism of the wear indicator apparatus that is operable outside the chute to retract the wear indicator portion out from the through opening for wear inspection, wherein the chute wall comprises a wall assembly of a lower wear resistant, outer shell and an inner liner secured to the outer shell with the inner liner including the internal flow surface of the predetermined wear resistant material, and the through opening extends through the outer shell and the inner liner.

6. The conveyor transfer chute system of claim 5 wherein the wear indicator portion comprises a base portion and a liner member that includes the wear internal surface and which is secured to the base portion with thicknesses of the base portion and the liner member corresponding to thicknesses of the outer shell and the inner liner of the chute wall assembly, respectively, so that the wear indicator portion has the same cross-sectional configuration as the chute wall assembly.

7. The conveyor transfer chute system of claim 4 wherein the wear indicator apparatus includes a mounting portion adapted to be affixed to an external surface of the chute wall with the wear indicator portion fit in the chute wall through opening.

8. The conveyor transfer chute system of claim 7 wherein the mounting portion comprises a mounting plate that is larger than the through opening, and the wear indicator portion comprises a plug portion secured generally centrally to the mounting plate and sized to have a clearance fit in the through opening.

9. The conveyor transfer chute system of claim 4 wherein the wear indicator portion has a thickness the same as that of the chute wall so that the internal wear surface is substantially flush with the internal flow surface of the chute wall.

10. A conveyor transfer chute system comprising:
at least one chute having an interior for forming a flow path for transferring conveyed material from one conveyor to another conveyor;
a wall of the chute extending about the flow path and having an internal flow surface of a predetermined wear resistant material along which the material flows;
a though opening in the chute wall at a predetermined location from which wear information is desired;
a wear indicator apparatus configured to be mounted to the chute wall for providing information regarding wear of the internal flow surface;
a wear indicator portion of the wear indicator apparatus having an internal wear surface of the same wear resistant material as the internal flow surface and being configured to be fit in the chute wall through opening to expose the internal wear surface to the material flow at the internal flow surface; and
a removal mechanism of the wear indicator apparatus that is operable outside the chute to retract the wear indicator portion out from the through opening for wear inspection,
the wear indicator portion comprises a liner member including the internal wear surface, and adjustment members for adjusting thickness of the wear indicator portion to position the internal wear surface to be substantially flush with the internal flow surface of the chute wall.

11. The conveyor transfer chute system of claim 4 wherein the wear indicator portion has a keyed, mating fit in the chute wall through opening so that the wear indicator portion is fit in the through opening in only a single orientation thereof.

12. A conveyor transfer chute system comprising:
at least one chute having an interior for forming a flow path for transferring conveyed material from one conveyor to another conveyor;
a wall of the chute extending about the flow path and having an internal flow surface of a predetermined wear resistant material along which the material flows;
a though opening in the chute wall at a predetermined location from which wear information is desired;
a wear indicator apparatus configured to be mounted to the chute wall for providing information regarding wear of the internal flow surface;
a wear indicator portion of the wear indicator apparatus having an internal wear surface of the same wear resistant material as the internal flow surface and being configured to be fit in the chute wall through opening to expose the internal wear surface to the material flow at the internal flow surface; and
a removal mechanism of the wear indicator apparatus that is operable outside the chute to retract the wear indicator portion out from the through opening for wear inspection, wherein the chute wall has an external surface, the wear indicator apparatus has a mounting portion including threaded apertures, and the removal mechanism includes fasteners having threaded shanks threaded in the threaded apertures external of the chute with the threaded shanks having distal ends in abutment with the chute wall external surface so that rotation of the fasteners in a removal rotary direction retracts the wear indicator portion out from the chute wall through opening external of the chute.

13. The conveyor transfer chute system of claim 12 wherein the chute wall external surface has one of a flat, angled and curved configuration, and the mounting portion comprises a mounting plate having a corresponding configuration to the chute wall external surface for being mounted in substantially flush engagement therewith.

14. A conveyor transfer chute system comprising:
at least one chute having an interior for forming a flow path for transferring conveyed material from one conveyor to another conveyor;
a wall of the chute extending about the flow path and having an internal flow surface of a predetermined wear resistant material along which the material flows;
a though opening in the chute wall at a predetermined location from which wear information is desired;
a wear indicator apparatus configured to be mounted to the chute wall for providing information regarding wear of the internal flow surface;
a wear indicator portion of the wear indicator apparatus having an internal wear surface of the same wear resistant material as the internal flow surface and being configured to be fit in the chute wall through opening to expose the internal wear surface to the material flow at the internal flow surface; and
a removal mechanism of the wear indicator apparatus that is operable outside the chute to retract the wear indicator portion out from the through opening for wear inspection,
wherein the chute wall has an external surface and mounting studs that project outwardly from the chute wall exterior surface about the chute wall through opening, and the wear indicator apparatus has a mounting portion including apertures for receiving the mounting studs therethrough for securing the wear indicator apparatus to the chute wall external surface.

15. A method for obtaining wear information for an internal flow surface of a chute through which material flows, the method comprising:

forming a through opening in a wall of the chute that extends around and along the internal flow surface;

inserting a wear indicator portion of a wear indicator apparatus into the through opening; and removably securing a mounting portion of the wear indicator apparatus to an external surface of the chute wall to expose an internal wear surface of the wear indicator portion at the internal flow surface so that the wear indicator apparatus can be secured to and removed from the chute from the outside of the chute for periodic wear inspections of the wear indicator portion, wherein the through opening is formed to have a keyed fit with the wear indicator portion such that the wear indicator portion is non-rotatably received in the through opening and so that after a wear inspection, the wear indicator portion can only be reinserted into the through opening in the same orientation as the orientation in which the wear indicator portion was inserted prior to the wear inspection.

16. The method of claim 15 wherein the wear indicator apparatus is removably secured to the chute wall external surface by removably fastening a mounting plate of the mounting portion to the chute wall external surface about the through opening so that the internal wear surface is substantially flush with the internal flow surface.

17. A method for obtaining wear information for an internal flow surface of a chute through which material flows, the method comprising:

forming a through opening in a wall of the chute that extends around and along the internal flow surface;

inserting a wear indicator portion of a wear indicator apparatus into the through opening;

removably securing a mounting portion of the wear indicator apparatus to an external surface of the chute wall to expose an internal wear surface of the wear indicator portion at the internal flow surface so that the wear indicator apparatus can be secured to and removed from the chute from the outside of the chute for periodic wear inspections of the wear indicator portion, wherein the wear indicator apparatus is removably secured to the chute wall external surface by removably fastening a mounting plate of the mounting portion to the chute wall external surface about the through opening so that the internal wear surface is substantially flush with the internal flow surface; and adjusting the thickness of the wear indicator portion with adjustment members that are removably secured between a mounting plate and a liner member of the wear indicator apparatus so that the internal wear surface of the liner member is flush with the internal flow surface of the chute wall when the wear indicator apparatus mounting portion is removably secured thereto.

18. The method of claim 15 wherein the through openings are formed at different locations in different chute components with a wear indicator apparatus used at each location, the method further including:

obtaining wear information from each wear indicator apparatus, and replacing liner plates that form the internal flow surface in the high wear locations of the different chute components as determined by the wear information obtained from each wear indicator apparatus.

* * * * *

UNITED STATES PATENT AND TRADEMARK OFFICE
CERTIFICATE OF CORRECTION

PATENT NO. : 8,919,522 B2  
APPLICATION NO. : 13/275566  
DATED : December 30, 2014  
INVENTOR(S) : John Cieplak and James Dorynek Page 1 of 1

It is certified that error appears in the above-identified patent and that said Letters Patent is hereby corrected as shown below:

IN THE CLAIMS:

Claim 4, Column 10, Line 17, delete "though" and insert -- through --.
Claim 5, Column 10, Line 57, delete "though" and insert -- through --.
Claim 10, Column 11, Line 43, delete "though" and insert -- through --.
Claim 12, Column 12, Line 8, delete "though" and insert -- through --.
Claim 14, Column 12, Line 46, delete "though" and insert -- through --.

Signed and Sealed this  
Twenty-seventh Day of October, 2015

Michelle K. Lee  
*Director of the United States Patent and Trademark Office*